Dec. 25, 1962 C. R. ROCHE 3,069,925
AUTOMATIC TRANSMISSION CONTROL SYSTEM
Filed June 29, 1950 3 Sheets-Sheet 1
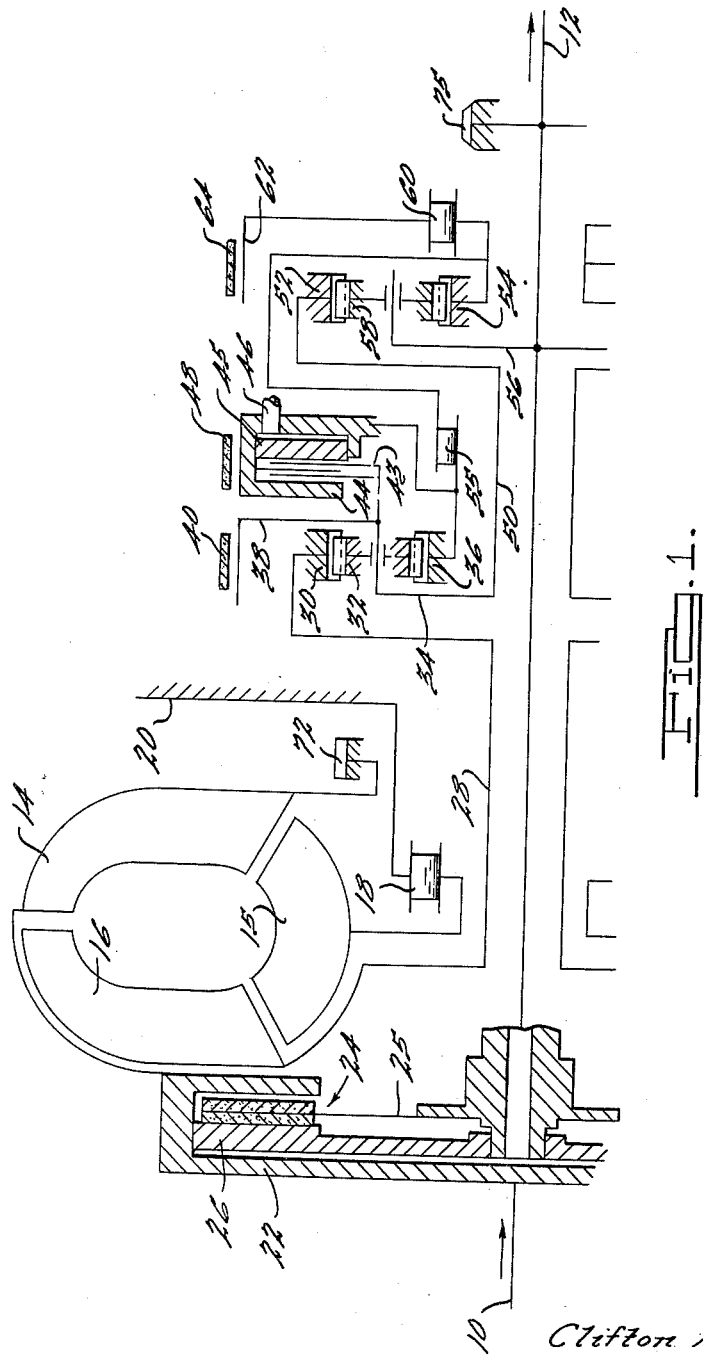
INVENTOR.
Clifton R. Roche.
BY
Harness, Dickey & Pierce.
ATTORNEYS.

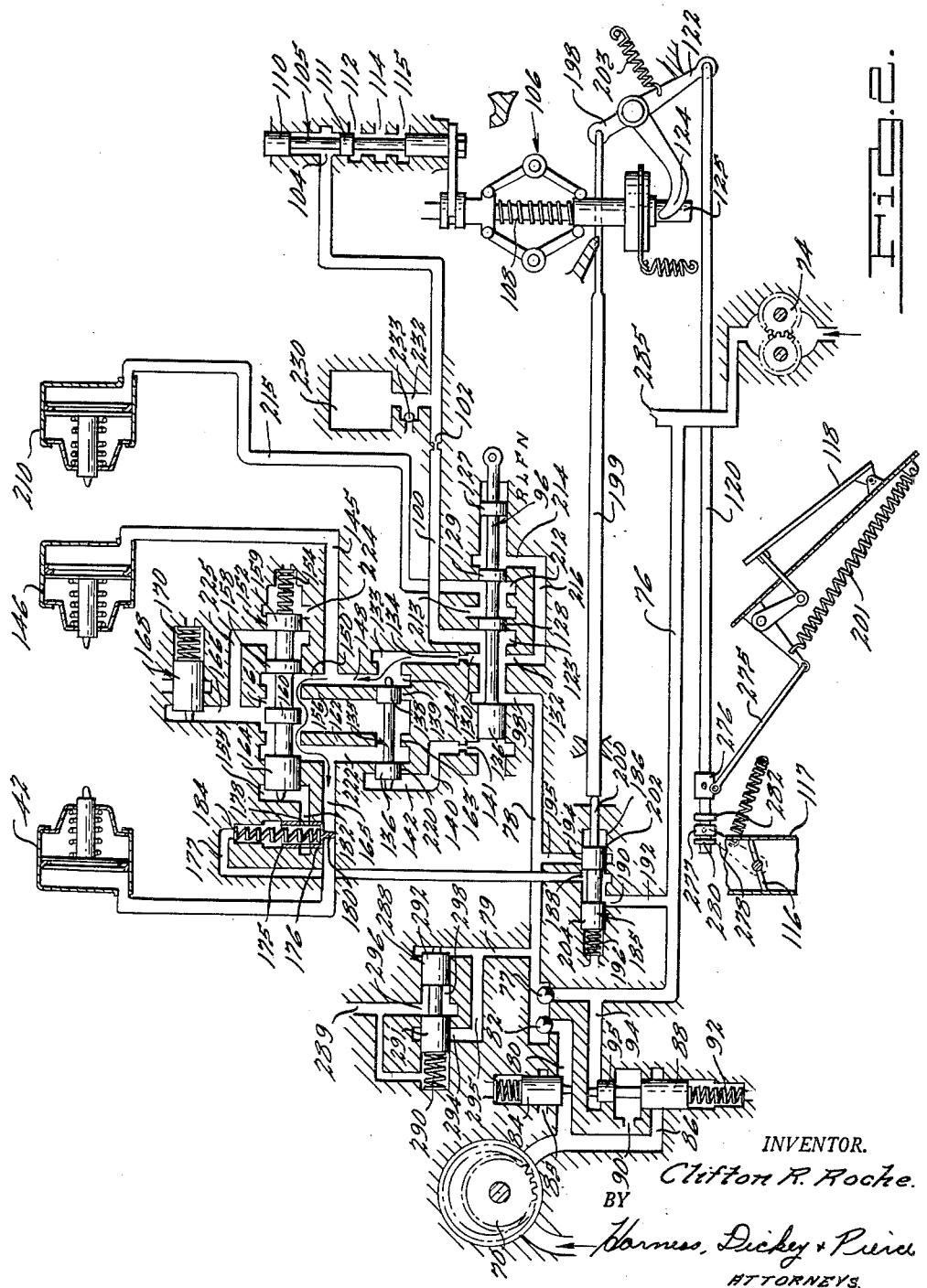

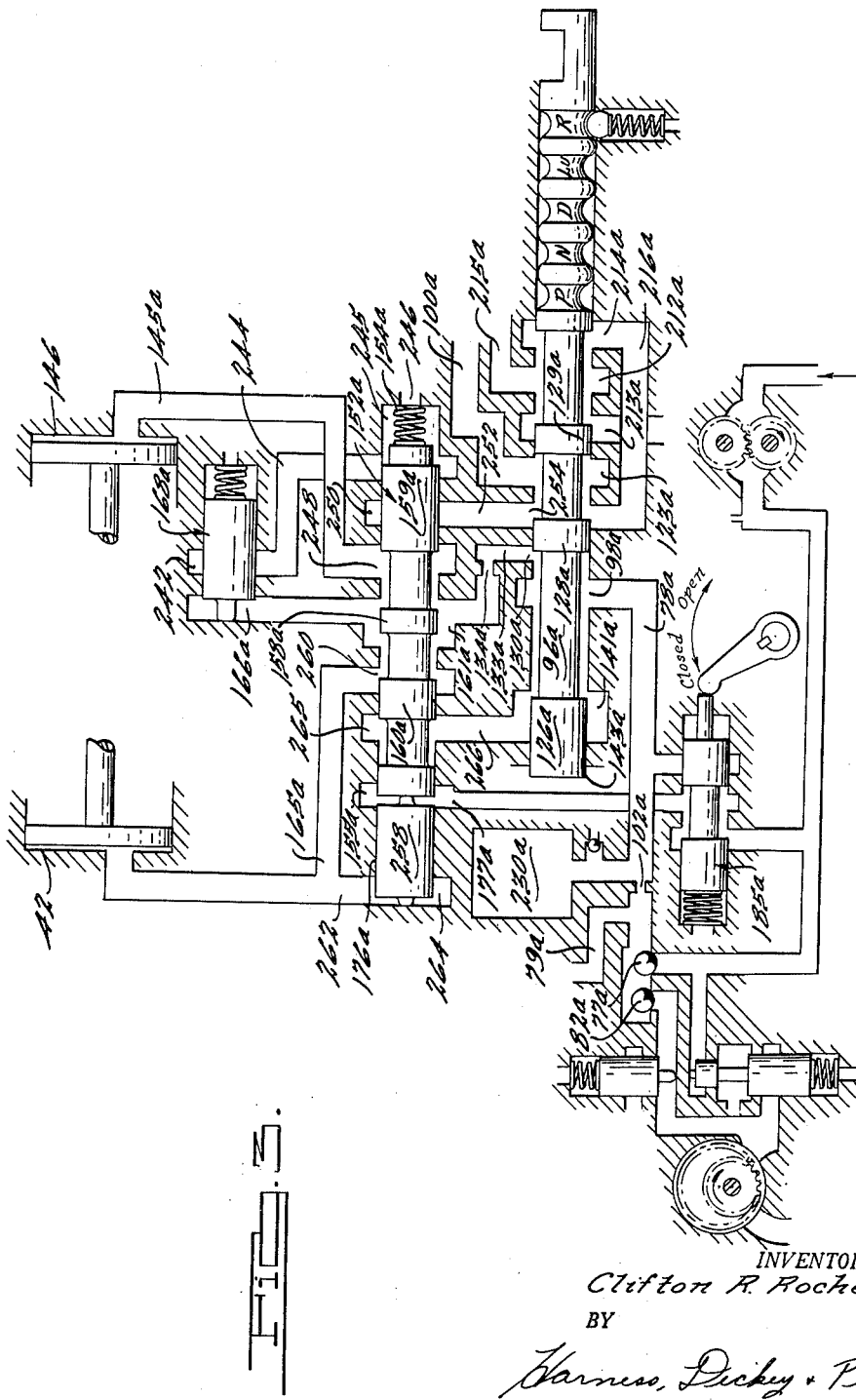

United States Patent Office 3,069,925
Patented Dec. 25, 1962

3,069,925
AUTOMATIC TRANSMISSION CONTROL SYSTEM
Clifton R. Roche, 101 S. Sycamore Ave.,
Los Angeles 36, Calif.
Filed June 29, 1950, Ser. No. 171,042
40 Claims. (Cl. 74—472)

This invention relates to the control of automatically operable transimissions, particularly for vehicular installations.

A primary object of the invention is to provide improved means, of relatively simple and inexpensive character, for preventing unwanted "creeping" of a motor vehicle equipped with an automatic hydrodynamic power transmitting device such as a torque converter or clutch of the Foettinger type.

Another object is to provide an improved control system for a transmission having a manually shiftable selector, wherein, when the car is standing still with the engine running, shifting the manual selector from neutral to any other position does not tend to cause the car to move or lurch, or cause any noise noticeable to the passengers.

Another object is to provide an improved system of the character indicated wherein the means for preventing creeping, lurching, and noise of the type known in the trade as "bumping," consists of simple hydraulic components, virtually all of which may be located entirely within the transmission casing, with no other parts except a simple link-type connection to the engine throttle control.

A further object is to provide such a system wherein the control of unwanted creeping does not involve any connection to the vehicle brakes or to any special holding means not inherently incorporated in the transmission mechanism.

It has heretofore been proposed to provide for automatic application of the vehicle brakes to prevent unwanted creeping movement of the car, but such a system has not been entirely satisfactory due to the fact that such automatic brake application must be at very light pressure, thereby necessitating accurate adjustment of the supplemental brake applying means. In view of the unavoidable expansion and contraction of the brake drums due to the heat generated in braking, it has not been possible to maintain such automatic anticreep devices which make use of the vehicle brakes in accurate adjustment under all operating conditions and for substantial periods of time. In this connection, therefore, it is another object of the invention to overcome the shortcomings of previously known automatic anticreep mechanisms and to provide a mechanism which is not unduly critical in adjustment and which remains effective despite wide variances of operating temperatures and conditions.

Another object is to provide such a system which is only effective when the accelerator pedal or other throttle control is completely released, and which becomes effective as the vehicle comes to rest, and which is only effective while the vehicle is fully at rest, or nearly so.

In its preferred form, the present invention is employed in conjunction with an automatic transmission construction which incorporates planetary gearing controlled by internal braking mechanisms, including a forward speeds brake and a reverse brake, as well as a pump which is operated only when the vehicle is in motion. When the vehicle is at rest and when the throttle is in its fully closed or idling position, a shift of the manual supervisory control from neutral to any other position applies both the forward speeds brake and the reverse brake at a very low pressure. As such brakes are applied with very low pressure, there is no thump or lurch as such shift is made, and as the transmission brake mechanism acts as a propeller shaft brake, the car does not creep. Upon depressing the accelerator, a valve allows the pressure to increase to normal in the actuating servomotor for the forward speeds transmission brake, and at the same time drains the servomotor for the reverse transmission brake, if the shift is to a forward speed position, or, conversely, drains the forward speeds brake servo if the shift has been to reverse and causes the full pressure to develop in the reverse brake servo.

Another object of the invention is to provide such a system in which the anticreep means will function repeatedly as the car is successively moved and stopped in a forward direction, even though the manual shifter is not touched, when the vehicle is proceeding in a forward direction with intermittent stops, but which will not function repeatedly in reverse, that is, which will hold the car against unwanted creeping toward the rear after a shift to reverse, but which will be rendered ineffective in reverse after the throttle has been opened, unless the shift handle or other supervisory control is moved back to neutral and then again to reverse.

Other objects and advantages of the invention will become apparent upon consideration of the present disclosure in its entirety.

In the drawings:

FIGURE 1 is a diagrammatic view of the principal components of an automatic transmission constructed in accordance with the present invention;

FIG. 2 is a schematic diagram of the principal control components for such a transmission; and FIG. 3 is a schematic diagram of a modified control system.

Referring now to the drawings, wherein FIG. 1 shows diagrammatically the principal components of a transmission with which my improved control system is adapted to be used, reference character 10 designates the transmission input shaft which is adapted to be connected to the engine (not shown) and 12 designates the output shaft. These parts and other components of the transmission are shown diagrammatically, since their details form no part of my present invention. A detailed disclosure of a complete transmission of this character is contained in my copending application Serial No. 748,382, filed May 16, 1947, now Patent No. 2,645,137, granted July 14, 1953.

The input shaft 10 is rigidly connected to the pump portion 14 of a hydraulic torque converter which includes a conventionally illustrated reaction portion 15 and a turbine portion 16. The reaction portion 15 is connected through an overrunning brake 18 with a stationary portion 20 of the transmission casing. Input shaft 10 also drives the casing 22 of a direct drive disk clutch assembly 24, the driven disk 25 of which is rigidly connected to the output shaft 12. The casing 22 is formed as a cylinder within which is a piston 26 which also constitutes a pressure plate, as shown in FIG. 1, for applying the direct drive clutch.

The turbine 16 of the hydraulic torque converter is connected by means of a tubular shaft 28, encircling the axially disposed output shaft 12, to the internal toothed ring gear 30 of a planetary gearset which also includes planet gears 32 supported by a carrier 34 and a sun gear 36, the planet gears meshing with both of the gears 30, 36. The carrier 34 is rigidly connected to a drum 38 which encircles the planetary gearset, and the drum 38 is adapted to be gripped and held by a brake band 40 operable by means of a hydraulically operable servomotor 42. The carrier is also rigidly connected to a set of clutch plates 43, which coact with driven clutch portions, the driven clutch portions including one wall of a drum 44 which also defines a hydraulic cylinder within which is a piston 45 actuatable to apply the clutch when fluid is supplied to the interior of the cylindrical drum through a conduit 46. The drum is also adapted to be gripped by a brake band 48.

The carrier 34 is connected by a tubular shaft 50 to the internal toothed ring gear 52 of a second or rear planetary gearset. The sun gear 54 of the second planetary gearset is connected through an overrunning clutch 55 to the front sun gear 36 and drum 44. The carrier 56 for the planet gears 58 of the rear set is rigidly connected to the output shaft 12. Sun gear 54 is also connected through another overrunning clutch 60 with a brake drum 62 which is adapted to be gripped and held by a brake band 64.

It will be understood that the arrangement of transmission components is shown by way of example and might be varied without departing from the principles of the invention. With the transmission components arranged as in FIG. 1, the hydraulic control system is so constituted that in the lowest speed forward drive the brake band 64 is applied, and all of the other transmission clutches and brakes are released. The overrunning clutches 55 and 60 function in the same relative direction and coact to prevent reverse rotation of both of the sun gears 36, 54. The engine then drives the forward internal toothed gear 30 through the hydraulic torque converter. The front sun gear 36 is held against reverse rotation and the carrier 34 is accordingly carried forwardly as the planet gears 32 roll on sun gear 36. This carries the rear internal toothed gear 52 forwardly at reduced speed and the rear planet gears 58 are rolled forwardly on the sun gear 54, the carrier 56 and output shaft 12 being thereby driven at a further reduced speed through the double reduction afforded by the two planetary systems in addition to the reduction and torque multiplication derived from the hydraulic torque converter.

When a higher speed gear ratio is desired, the clutch in the drum 44 is also engaged, the band 64 remaining engaged, and the other brakes and clutch 24 remaining released. The front planetary gearset is thus locked up and rotates as a unit, the entire gear reduction being provided by the rear planetary gearset. A direct drive which eliminates the torque converter is provided by engagement of the direct drive clutch 24. A reverse drive is provided by engagement of the reverse brake band 40. In reverse, the planet gears 32 are turned forwardly upon their shafts in the stationary carrier 34 which is held by the brake band 40, and the sun gear 36 drives the rear sun gear 54 in a reverse direction through the overrunning clutch 55, which functions to transmit the drive in the reverse direction. The rear planetary gears 58 are thus rolled rearwardly upon the internal toothed gear 52 carrying the rear carrier 56 and output shaft 12 rearwardly at reduced speeds.

As diagrammatically indicated in FIG. 2, the transmission also incorporates a pump 70 drivable by the engine, as by means of a gear 72 connected to the pump portion 14 of the hydraulic torque converter. Pump 70 is commonly referred to as the front pump. A second or rear pump 74 is provided drivable by the output shaft 12 as by means of a gear 75. The output of the rear pump is conducted through conduit means 76 and a check valve 77 to a main fluid supply conduit 78. The output of the front pump is conducted through a conduit 80 and check valve 82 to the same main supply conduit 78. Connected to the conduit 80 and actuatable by the pressure therein is a pressure relief valve plunger 84 which may be set to maintain the front pump output pressure at a predetermined value, as for example, 80 p.s.i., and to discharge any excess, when such value is exceeded, through a dump port 85. The output of the front pump is also connected by a branch conduit 86 to a side port of a spool valve 88 which normally maintains the passage 86 closed, but which is adapted to open, to connect passage 86 to a discharge port 90 when the rear pump pressure in the conduit 76 rises above a predetermined value, as for example when the rear pump pressure reaches 83 p.s.i. The valve 88 is urged toward closed position by a suitably calibrated spring 92 which is opposed by the pressure in conduit 76, the pressure in the conduit 76 communicating through a branch conduit 94 with a head formed by a spool 95 on the opposite end of the valve 88 from the spring 92. When the front pump is dumped by the rear pump, due to the downward movement of valve 88, to connect conduit 86 with discharge port 90 in the manner described, rear pump pressure is delivered to the main line 78 and holds the check valve 82 closed. Valve spool portion 95 also acts as a pressure limiting valve for the rear pump, by discharging excess through the port 90 when the pressure in conduit 94 is sufficient to force the spool portion 95 downwardly far enough to establish communication between passage 94 and port 90.

The control system incorporates a manually operable selector valve, generally designated 96, shown as movable to reverse, lock-up, forward and neutral positions, and which is illustrated in the forward position. In a typical automotive installation, this valve might be shiftable by a hand lever on the steering column. Valve 96 is of the multiple spool-type and has an inlet port 98 connected to the main line 78. One outlet of the valve is connected through a conduit 100 and a restriction 102 to an inlet port 104 of an automatic ratio control valve 105. Valve 105 is shown as operable by a centrifugal governor assembly generally designated 106, the action of which is modified in certain respects and the construction and arrangement of which may correspond to the disclosure of my copending application Serial No. 109,301, filed August 9, 1949, and now Patent No. 3,025,725.

Governor 106 tends, in response to increase of car speed, to move control valve 105 downwardly against opposition of a spring 108, while the valve is urged upwardly by the spring in response to decreasing vehicle speeds. With the vehicle at rest and the selector valve 96 in forward drive (F) position, the control valve inlet port 104 is isolated by valve spools 110, 111, and the outlet ports 112, 114 of the control valve are connected with a dump port 115. Port 112 is connected to the conduit 46 leading to the second-speed clutch assembly of the transmission previously described, while port 114 is connected to the space within the cylinder 22 for actuation of the direct drive clutch.

The throttle valve 116 of the engine is operable by means of an accelerator pedal 118, which is connected through suitable linkage as 275 to a collar 276 rigidly secured to a slidable and limitedly rockable rod 120 leading to a bellcrank 122. (A fragment of the engine intake manifold is shown at 117.) Bellcrank 122 has a finger portion 124 adapted to bear upwardly upon the governor assembly, which is bodily slidable upon its shaft 125, such upward pressure being exerted by the finger 124 in response to depression of the accelerator pedal and being adapted to oppose upshifting (downward) movement of the control valve 105, or to cause a downshift, depending upon the relative pressures exerted upon the elements in question, as will be apparent.

The other end of the rod 120 extends slidably through an eye portion 277 formed upon the end of the actuating arm 278 for the throttle valve 116. Secured to the terminal portion of the rod 120 upon opposite sides of the eye portion 277 are abutments 280, 282, which are spaced apart a distance exceeding the thickness of the eye portion, thereby providing lost motion connection between the accelerator pedal and the throttle. This lost motion travel, which is relatively slight, is utilized to actuate an accelerator valve 185, the function of which will presently be described.

With the valves 96, 105 in the positions shown and the vehicle at rest, fluid is supplied by the front pump 70 only, and such fluid enters a chamber of the housing of valve 96 through a side port 98. Spools 126, 128 are then on opposite sides of port 98, and also on opposite sides of ports 130, 132 and 123. Port 130 communicates with a passage 133. Passage 133 also incorporates a restriction 134 and extends to one end of a ported chamber (undesignated) which contains a shuttle valve 135. Shuttle valve 135 consists of a central stem having two spool portions as 136, 138, one located at each end, and is freely movable by pressure applied to either end thereof. The pressure delivered through conduit 133 is exerted upon the spool 138 at the right end of the shuttle valve, as viewed in FIG. 2. The spool 136 at the other end of the valve is adapted to be subjected to pressure delivered thereto through a passage 140 when selector valve 96 is moved to reverse (R) position. Passage 140 communicates with a chamber 142 which encloses the left end of the shuttle valve. With the parts positioned as shown, the pressure generated by the front pump maintains the shuttle valve at the left end of its movement, as shown in FIG. 2, and the fluid under pressure is accordingly delivered through a port 144, passage 148 and a conduit 145 to the cylinder 146 of the actuating servomotor for the forward speeds brake band 64.

The fluid is also conducted through the passage 148 to a port 150 of an anticreep control valve, generally designated 152. The anticreep control valve 152 is also of the multiple spool-type, and is urged to the left by a spring 154 and is adapted to be urged to the right against the effort of the spring 154 by fluid delivered to a chamber 155 at the left end thereof, such fluid being derived in a controlled manner presently to be described either from the rear pump output conduit 76 or from the main fluid supply conduit 78.

It will be noted that the shuttle valve 135 and anticreep control valve 152 are arranged parallel to one another. These valves are housed in the same valve body and the spools of the two valves are positioned to coact with one another. When both of these valves are at the left ends of their movement, as shown in FIG. 2, the fluid delivered through passage 148 to the port 150 in the bore in which valve 152 is fitted travels around the end of a partitioning wall 156 passing through the valve space between the spools 158, 160 of the valve 152, then passes around the outside of the valve spool 160 through the space between walls 156, 162, around the inner end of partition 162, through the chamber of valve 152 between the spool 160 and a spool 164 on the left end of such valve, and into a conduit 165 leading to the servomotor cylinder 42 for the reverse brake band 40. A relatively wide central port 161 of the valve body at such time communicates with the chamber of valve 152 between the spools 158, 160 and also with the chamber between spools 160 and 164. Port 161 communicates through a passage 166 with a piston-type pressure relief valve 168 which is so biased by its spring 170 as to tend to maintain the pressure in this portion of the system (beyond the orifice 134) at a low value, which may be of the order of 6 to 10 p.s.i. Thus it will be seen that this low pressure is delivered to the cylinders 146 and 42, so that the brake bands 64 and 40 are both applied at low pressure, and the front planet gear carrier 34, and rear internal gear 52 are thereby held stationary with sufficient force to hold the car against creeping. Drag torque from the torque converter tends to turn the planet gears 32 forwardly on their carrier spindles, but this is pevented because the brake band 64, acting through the overrunning clutches 60 and 55, keeps the sun gear 36 from turning backwardly. Thus no torque can be transmitted to the propeller shaft from the engine when the parts are in this condition, with the accelerator pedal fully released.

The means for controlling the pressure in the chamber 155 at the left end of the anticreep control valve includes a hollow piston valve 175 slidable in a cylindrical chamber 176 which intersects the passage 165, so that the head of the piston valve is exposed to the pressure in passage 165. The hollow end of the valve piston 175 communicates with a passage 177, and the side wall of the valve piston is provided with a plurality of apertures 178 extending therethrough. The valve piston has a stop 180 which limits its travel into the passage 165, and when the valve is projected as fully as possible into the passage 165, the ports 178 are aligned with a passage 182 which communicates with the chamber 155. The piston valve is biased toward such position, in which it is shown in FIG. 2, by a spring 184 and in such position of the piston valve, the chamber 155 communicates through the passage 177 with the chamber 186 of an accelerator valve, generally designated 185.

The accelerator valve is slidable in chamber 186 and consists of two spool portions 202, 204 joined by a reduced neck. One side port 188 communicating with the valve chamber is connected to conduit 177. Another side port 190 communicates through a passage 192 with rear pump output conduit 76. As shown in FIG. 2, the port 190 is near the left end of the valve chamber, while the port 188 is near the center of the valve chamber. A third side port 194 near the right end of the valve chamber communicates through a passage 195 with main fluid supply conduit 78. The valve is biased to the right, as viewed in FIG. 2, by a compression spring 196, but such bias is insufficient to move the valve to the right against the opposition of the accelerator and linkage biasing springs 201, 203 which are strong enough to hold or move the valve to the left against the opposition of spring 196.

The bellcrank 122 is provided with a third arm 198 to which a link 199 is connected. Link 199 is capable of moving the accelerator valve 185 to the left only, acting thereupon through a pushrod 200. With the accelerator raised, the valve 185 stands in the position shown in FIG. 2 wherein the passage 195 to the main line 78 is closed off and passage 192 communicates with conduit 177 through the valve chamber space between the valve spools 202, 204. It will be noted, however, that port 190 is almost closed off by the spool 204 so that upon the first slight downward movement of the accelerator pedal which occurs during the lost motion travel permitted by the abutments 280, 282, previously described, link 199 is moved away from the pushrod 200, allowing the spring 196 to move the spool valve to the right, as viewed in FIG. 2, closing off the port 190 and interrupting communication between piston valve chamber 176 and the rear pump outlet conduit 76. The spool 202 of the accelerator valve is also so positioned that the initial travel of the valve during such lost motion also uncovers the port 194, and communication is thereby established between the piston valve chamber 176 and the main fluid supply line 78, by way of conduit 177, port 188, port 194 and passage 195.

The communication between the piston valve chamber 176 and the rear pump outlet conduit 76 when the accelerator is raised, as shown in FIG. 2, constitutes means for automatically holding the anticreep control valve 152 to the right, when the accelerator pedal is released with the car in motion. It also acts to move the valve 152 to the right in event the car should be moved forwardly from a standing position because of the exertion thereupon of sufficient force to exceed the braking effect of the anticreep means, that is, the drag upon the reverse brake drum 38 and forward transmission brake drum 62. Such force might result from pushing the car or from the effect of gravity when the car is heading down hill, and it will be appreciated that it would be undesirable to drag the transmission brake bands 40, 64 at such time, or upon release of the accelerator with the car in motion. Since the rear pump is operated by movement of the car, under such conditions, fluid is delivered from the rear pump to the interior of the piston valve 175 in the manner described, and then passes through the ports 178 and 182 to the chamber 155 where it acts upon the left end of the spool 164, holding the anticreep control valve 152 at the right, or moving it to the right, against the resistance of spring 154.

With the anticreep valve 152 at the right end of its movement spool 160 closes off the passage 148 at the anticreep control valve by sealing engagement with the partition 156. This interrupts communication between the low pressure relief valve 168 and the fluid supply derived from the main line 78 via selector valve 96 and passages 133, 148. It also interrupts the supply of such fluid to the reverse transmission brake servomotor 42, and fluid at the full supply pressure is then delivered to the forward speeds transmission brake servomotor 146 so that the forward speeds band 64 is applied with full pressure. If, with the system in the condition shown in FIG. 2 and the vehicle stationary, the accelerator is depressed, the connection between the piston valve chamber 176 and the rear pump supply is immediately cut off, as previously stated, piston valve chamber 176 then being connected to the main line 78. The fluid delivered to chamber 176 passes in to chamber 155 and moves valve 152 all the way to the right to disconnect the reverse servo 42 and establish the normal forward drive condition as before. Fluid is supplied to the main line from the front pump 70 at the control pressure, until the output pressure of the rear pump rises to a value such that it causes dumping of the front pump output in the manner previously described.

It will be noted that when the car is standing still with the engine running and the accelerator raised, the lower end of piston valve 175 is exposed to the low pressure at which the relief valve 168 is set, since such pressure exists in the conduit 165. The spring 184 is strong enough to overcome such reduced pressure, however, and holds the piston valve down.

The illustrative transmission construction shown in FIG. 1 is also provided with a lockup transmission brake to allow for placing the transmission permanently in a reduced gear drive which provides engine braking. This is of course desirable in descending long hills. The lockup brake band is designated 48 and the servomotor for actuating such brake band, shown in FIG. 2, is designated 210. When the selector valve 96 is moved to the lockup position, designated L, which is one notch further to the left than such valve as shown in FIG. 2, the spool 129 of such valve moves to the left of the port 212 formed in the side of the chamber of such valve, while the right end valve spool 127 remains to the right of the port 214 of such valve, port 214 being located to the right of, but relatively close to, the port 212. Port 212 is connected to the servomotor 210, as by a conduit 215, while port 214 is connected by a passage 216 to valve port 132 which is located in substantial transverse alignment with the port 130 and relatively close to the fluid inlet port 98. It will also be noted that at this time the spool 128 has moved to the left of the port 123 which communicates with the inlet port 104 of automatic control valve 105 by way of conduit 100. The automatic control valve 105 is thus cut off from the fluid source and the fluid is supplied directly to the lockup servomotor 210 from main line 78 by way of ports 98, 132, passage 216, ports 214, 212 and conduit 215. The fluid supply is at such time also maintained to the servomotor 146, since port 130 is also being supplied with fluid, as will be apparent.

If the selector valve is moved all the way to the left, to the reverse position designated R, the left spool 126 of the selector valve moves to the left of a port 141 in the side of the valve chamber near the left end thereof. Port 141 is connected to passage 140 which leads to the chamber 142 at the left end of the shuttle valve 135. In such position of the selector valve, the spool 128 is located between the port 98 and the transversely aligned ports 130, 132. The fluid supplied to the control valve 105 and to the lockup servomotor 210 is thus cut off, and the fluid supplied to the right end shuttle valve chamber 133 and to the forward speeds servomotor 146 via passage 148 is also cut off. Fluid then delivered to the chamber 142 moves the shuttle valve to the right. It will be seen that such shifting of the shuttle valve occurs immediately after movement of the selector valve to the reverse position with the engine running, even though the accelerator pedal is up, and that fluid is then delivered to the reverse servomotor 42, passing through the chamber in partition 220 which was formerly blocked by the left shuttle valve spool 136. The fluid then passes through a passage 222 located to the left of partition 162 and via conduit 165 to reverse servomotor 42. Inasmuch as the anticreep control valve 152 is at the left end of its movement, the passage 166 is still in communication with the passage system 222, 165, etc., and limits the pressure to the relatively low anticreep value, which is not sufficient to raise the piston valve 175 against the resistance of spring 184. The anticreep means is thus effective and holds the car stationary as long as the accelerator pedal remains up and as long as the holding effort of the anticreep means is actually sufficient to keep the car from moving, the action at this time being similar to the action when the selector valve is in the F position, as previously described.

As soon as the accelerator pedal is depressed far enough to introduce sufficient pressure from the main line to the chamber 155 and the anticreep valve 152 is moved to the right in the manner previously described, the low pressure relief valve 168 and the forward drive servomotor are isolated as also previously described; but prior to such depression of the accelerator, the anticreep valve 152 remains at the left, and the low pressure determined by the valve 168 is supplied to both of the servomotors 42, 146. The communication to effect such supply is effective because the spool 160 is then located in the position shown in FIG. 2, in the enlarged chamber 161 of such valve between the partitions 156, 162. Chamber 161 also communicates with the passage 166 leading to the low pressure control valve 168, while spool 164 is located to the left of passage 222 and spool 158 is located to the right of passage 148, so that the fluid may pass around the upper ends of such partitions to reach the conduit 145.

It will be observed that when the anticreep valve 152 is moved to the right, the shuttle valve 135 also remains to the right and a vent for the forward drive servomotor 146 is provided, since conduit 145 then communicates with a vent 224 in the side of the chamber of valve 152 near the right end thereof. Such communication is by way of passage 148, the chamber 139 in partition 156 which is then unblocked by shuttle valve spool 138, through the anticreep valve chamber space between spools 160, 164 and by way of passages 166, 225 to the anticreep valve chamber space between spools 158, 159, which chamber space then communicates with escape port 224.

It will be seen that a similar vent for the reverse drive servomotor 42 is provided when the vehicle is accelerated forwardly with the selector valve in the forward position. At such time the shuttle valve 135 remains at the left, and when the anticreep valve 152 moves to the right, the reverse servomotor is placed in communication with the vent 224 by way of conduit 165, passage 222 to the chamber 163 in partition 162 which is then unblocked by the spool 136 and through the passage between partitions 156, 162, through the anticreep valve chamber space between spools 160, 164, passages 166, 225, the anticreep valve chamber between spools 158, 159 and to the escape port 224.

If with the selector valve in reverse and the car rolling backwards, the accelerator pedal is released, the accelerator valve 185 returns to the position shown in FIG. 2, the fluid pressure above the piston valve 175 is relieved, since the rear pump 74 develops no pressure when turning backwards, and the line 177 leading to the piston valve chamber is then connected only to the rear pump. The anticreep control valve 152 remains at the right, however, because the high pressure then existing in the conduit 165 immediately overcomes the spring 184, raising the piston valve 175 far enough to uncover the passage 182 and establish communication between the passage 165 and chamber 155. The high pressure from the main line 78 thus enters chamber 155 and is effective to hold the valve 152 to the right. This prevents the re-engagement of the anticreep means in reverse after the anticreep valve 152 has been moved to the right pursuant to the first depression of the accelerator pedal. A desirable operating characteristic is thereby imparted to the car. If with the car standing still, the selector valve is shifted to reverse, the anticreep means immediately becomes effective so long as the accelerator pedal is not depressed, as previously stated. When the accelerator pedal is depressed, the anticreep means is released and the car moves rearwardly. So long as the accelerator pedal is held down, pressure from the main line holds the anticreep valve to the right, being supplied to the chamber 155 through passage 195, past the central stem portion of the accelerator valve 185 and via passage 177, ports 178, and passage 182. Although under such conditions, the anticreep valve being moved to the right and the pressure relief valve 168 cut off from the passageway system 222, 165, etc. leading to the reverse servomotor 42, high pressure also exists under the piston valve 175, the latter valve is held down by its biasing spring 184, the fluid pressures above and below the piston valve being equal. Once the accelerator pedal is released, however, the pressure is quickly relieved above the piston valve, since the rear pump 74 delivers no pressure above the piston valve when the car is standing or reversing. The high pressure in the passage 165 then moves the piston valve 176 up and holds it up until either the engine is stopped or the selector valve is moved out of the reverse position. Although subsequent depression of the accelerator pedal will again permit the piston valve 175 to descend, the pressure is still maintained in the chamber 155 to hold the anticreep valve in the right-hand locked-out position, as will be apparent.

The supply conduit 76 from the rear pump also incorporates a restricted bleed orifice 285 which assists in the release of pressure from the piston valve chamber 176. It will be noted that this bleed orifice performs an additional function in that as the car is brought to a stop, it allows the pressure to drop more rapidly above the piston valve and thereby permits faster engagement of the anticreep holding means. This action is highly desirable in ordinary driving in a forward direction.

By reason of the fact that the lost motion connection between the accelerator pedal and throttle valve permits the accelerator valve to be moved far enough to the right to establish communication between the main line 78 and the passage 177 before the engine throttle is opened, whenever the accelerator is depressed, the release of the anticreep means which is thereby effected prevents the engine from "bumping" the car, as would be the case if the engine were speeded up with the anticreep means still holding.

Connected to the conduit 100 at a point farther from the selector valve 96 than is the orifice 102 is a cushioning reservoir 230 which is closed at its top and adapted to contain entrapped air. A passage 232, which is below the pressure chamber and which is preferably vertical, connects such chamber to the conduit 100 and is also connected to an inwardly opening ball check valve generally designated 233. The ball check valve is located at a position above the oil level in the transmission, so that when this valve is open, air can enter the pressure dome. When pressure is delivered through the conduit 100, it immediately closes the check valve 233, and as the oil rises in the passage 232, it displaces the air upwardly into the pressure chamber. This arrangement provides for constant replenishment of the air in the pressure chamber. The action of pressure chambers of this character is considered more fully in my copending application Serial No. 109,301 filed August 9, 1949. This chamber serves as a cushioning device to regulate the rate of engagement of the clutching and braking means controlled by the automatic valve 105.

When with the vehicle at rest, the selector valve is moved from neutral position to either the forward or reverse position, the automatic governor valve 105 is in the up position as shown in FIG. 2. Such movement of the selector valve uncovers the main fluid supply port 98 and if the selector valve is moved to F, introduces fluid to both of the conduits 100, 133. The rate of build-up of pressure is modified by the action of the cushioning chamber 230. No fluid is at this time delivered to the servomotors, except through the anticreep system previously described, and the rate of build-up of fluid pressure in the servomotors is controlled by the orifice 134 (or orifice 141 if the selector valve is shifted to reverse), while the maximum pressure therein is controlled by the low pressure control valve 168, so that even the low pressure application of the forward and reverse transmission brake bands which occurs to hold the vehicle against creep, is relatively gradual. There is no noise or thump due to such application of the transmission brake bands, and no torque is applied to the transmission components in a manner to cause a noise or slight lurch of the vehicle such as is commonly referred to in the trade as "bumping." The "bump" which is imparted to a vehicle equipped with some types of automatic transmission, when the selector shift lever is moved from the neutral position to one of the driving positions, gives the occupants of the vehicle an unpleasant sensation. The "bump" is due to the fact that when the selector shift lever, in such constructions, is moved from neutral to a driving position, a brake band is suddenly applied which suddenly stops the parts of the transmission such as the turbine member of the converter, and certain parts of the transmission that rotate in neutral, thereby causing a bump. Also, upon the application of the brake band, the creep torque is suddenly applied to the drive shaft, tending to cause the vehicle to lurch. Even if the vehicle is held by means of the vehicle brakes, either by the drive or by some automatic system, the bump still occurs, because of the accumulation of tolerances in the line of drive. It will be seen that the arrangement herein disclosed completely eliminates this objectionable characteristic, as the creep torque is eliminated and the brake bands are softly applied, due to the low pressure valve 168 and the other means above described for softening the initial pressure to the servomotors, and thus the application of the brake bands. In the drawings of the present application, the engine is represented by the fragmentary portion of the intake manifold thereof illustrated at 117 in FIG. 2 and by the shaft 10, FIG. 1, which may comprise the crankshaft of the engine, while the driven portions of the vehicle are represented by the shaft 12.

As also shown in FIG. 2, a conduit 79 extending from the main line 78 is provided, leading to a pressure control valve generally designated 288, from which a continuation conduit 289 extends, through suitable connecting means not necessary to be illustrated, to the hydraulic torque converter, to maintain the supply of fluid in the converter. The pressure of such converter fluid is determined by the action of the valve 288 which is governed by a spring 290 which urges the valve to the right, as viewed in FIG. 2. The valve consists of two spaced spool portions 291, 292 and connecting stem. The conduit 79 leads to the right end of spool 292 and pressure in the main line 78 therefore tends to move the valve to the left against the resistance of the spring. When the valve is at the right, it blocks off a port 294 connected to a branch conduit 295 communicating with the conduit 79. The continuation passage 289 communicates with a port 296 which communicates with a central portion of the chamber 298 in which the valve is slidable. When pressure in passage 79 moves the valve to the left, spool 291 uncovers the port 294 and establishes communication between the passages 79, 289, and the extent to which the port is uncovered depends upon the relative pressures existing in the respective passages 79, 289, as influenced by the spring 290. This regulates the pressure in passage 289 and so in the converter. For a further consideration of the action of such a pressure limiting valve incorporated in the supply system for a hydraulic torque converter, reference may be had to my copending application Serial No. 109,301, filed August 9, 1949.

Although in this discussion the hydrodynamic means is a torque converting device, it will be recognized that insofar as the present invention is concerned, its function might merely be that of a fluid coupling clutch. In the appended claims, therefore, the expressions "torque conveying device" and "fluid flywheel" are intended to encompass all such devices whether or not they function as torque converters.

In FIG. 3, I have shown another somewhat modified arrangement which eliminates the need for the shuttle valve 135, and wherein the actuating means for the anticreep control valve is simplified. In FIG. 3, parts analogous to those already described are designated by like reference characters, distinguished by the addition of the letter *a*, and many of these will require no detailed redescription. In this embodiment, the cushioning chamber 230a is connected to the main fluid supply line 78a, instead of to the conduit 100a leading to the governor valve. The cushioning effect as well as an accumulator effect of the air chamber is thus imposed not only on the second speed and direct drive clutches but also upon the forward speeds servo 146 and the reverse servo 42 so that a faster shift is obtained. The restriction defined by the orifice portion 102a is located between the cushioning chamber 230a and the check valves 82a, 77a, constituting the inlets for fluid from the front and rear pumps, respectively. When the engine is running and the selector valve is in neutral, the fluid will enter the cushioning chamber and compress the air above it. When the selector valve is shifted, the compressed air forces the fluid from the cushioning chamber into the servomotors faster than it would be supplied by the pump alone, which at the time is usually rotating at a relatively slow speed. The conduit 79a leading to the hydraulic torque converter, and which maintains the supply of fluid therein, is connected to the main line 78a between the check valve 77a and the restriction 102a.

The passage 133a leads from the selector valve to a relatively wide port 161a at one side of the chamber of the anticreep control valve 152a near the middle thereof. Passage 133a also incorporates a restriction designated 134a. The port 161a communicates through a passage 166a with the low pressure relief valve 168a. Instead of venting directly back to the sump, as in the case of the valve 168 of the first-described embodiment, the pressure relief port 242 of valve 168a is connected through a passage 244 with the chamber 245 at the right end of the anticreep control valve 152a. Chamber 245 is vented to atmosphere through an end port 246, and such chamber also contains the valve biasing spring 154a. The conduit 145a leading to the forward speeds servomotor cylinder 146 is connected to an anticreep control valve port 248 located next adjacent, but spacedly to the right of, the port 161a. Another port of such valve located next adjacent to, and to the right of, port 248 is designated 250, and communicates through a passage 252 with a port 254 formed in the side of the chamber of selector valve 96a next adjacent and to the right of the port 130a, to which passage 133a is connected. Passage 216a connects port 254 with a port 214a farther to the right along the chamber of valve 96a. The ports 123a and 212a which are respectively connected to the governor valve, to conduit 100a and to the lock-up servo conduit 215a, are located similarly to the corresponding ports of the selector valve of the first-described embodiment, and a vent port 213a is located between them in similar fashion.

The construction and arrangement of the accelerator valve 185a may be similar to the first embodiment, as shown, but the conduit 177a leads directly to the chamber 155a at the left end of the anticreep control valve.

Located in a coaxial extension 176a of the chamber of the anticreep control valve is a piston 258 which is adapted to bear against the left end of the anticreep valve 152a to move the same to the right against the resistance of spring 154a.

The reverse transmission brake servo 42 is in this embodiment connected by means of conduit 165a to a port 260 formed in the chamber of the anticreep valve next adjacent, but to the left of, the inlet port 161a. A branch conduit 262 leads from the conduit 165a to a chamber 264 at the left end of the piston 258. A port 265 located in the anticreep valve chamber between the ports 260 and 155a communicates through a passage 266 with a chamber 141a near the left end of the selector valve, and which is open to atmosphere through an axial vent defined by the open left end portion 143a of the selector valve casing, except when the selector valve is in the reverse drive position at which time it slides into and blocks the opening 143a as shown in FIG. 3.

When with the vehicle at rest and the accelerator pedal fully released, the selector valve is moved to the forward drive position, the fluid is delivered to the forward and reverse servos 146 and 42 at low pressure, as in the previous embodiments, but is conducted directly from the conduit 133a through the restriction 134a, and through ports 161a, 248 and 250 to the conduits 145a, 165a, respectively, leading to such servomotors. At such time, the anticreep valve will be held in the left-hand position, since the rear pump is not operating and no fluid is delivered to the chamber 155a so long as the accelerator pedal is released. The pressure developed in the chamber 264 by the low pressure fluid is not sufficient to overcome the resistance of the spring 154a. If the vehicle is moving, however, the fluid delivered to the chamber 155a moves the anticreep valve to the right or holds it in the right-hand position as the case may be.

When the anticreep valve is in the right-hand position, its spool 158a seals the partition between the ports 161a, 248, and its spool 159a moves to the right of the port 250, and also closes off the vent 246 from the low pressure relief valve 168a. Fluid under full pressure is then delivered from the selector valve through the passage 252 and through the chamber opening in the partition between ports 248, 250, and via conduit 145a to the forward speeds servo 146. At the same time, the spool 158a seals the partition between ports 248, 161a, the spool 160a moves to the right of the port 260 and isolates such port from the port 161a, and the reverse servo is then vented through the valve chamber portion between ports 260, 265 and via port 265 and passage 266, and chamber 141a to vent 143a.

When the selector valve is moved all the way to the left to the reverse drive position, the spool 126a closes the vent 143a and moves part way into the chamber 141a, so that communication is established between the fluid inlet port 98a of the selector valve and the passage 266. The selector valve spool 128a is located between the ports 130a, 254, so that communication between the fluid supply line 78a and the passage 133a is maintained and fluid is delivered to both servos 42, 146 at low pressure in the same manner as when the selector valve is moved to the forward drive position. If the vehicle is in motion or if the accelerator pedal is depressed, fluid is delivered to the chamber 155a through the accelerator valve, also as previously described, and the anticreep valve 159a is moved to the right. Spool 158 then interrupts communication between ports 161a, 248, and the fluid supply to the forward speeds servo 146 is interrupted because the spool 128a of the selector valve is now to the left of the port 254. The forward speed servo is now vented, however, through conduit 145a, ports 248, 250, passage 252, port 254, passage 260a, and ports 214a, 213a. The spool 159a of the anticreep valve being to the right of the partition between ports 248, 250, and the spool 129a of the selector valve being to the left of the partition between ports 212a, 213a, it will be seen that the fluid flows lengthwise through the chambers of these valves between ports 248, 250 of the anticreep valve, and between ports 214a, 212a and 213a, during such venting, the lockup servo being also vented to the port 213a at such time. At the same time, the fluid is delivered at full pressure to the reverse servo 42 by way of passage 266 and ports 265, 260 and conduit 165a, the spool 160a having moved to the right of the port 260. Now in the event the throttle is closed, so that the chamber 155a does not receive pressure from the supply line 78a through the accelerator valve 185a (the rear pump cannot supply pressure when the car is operating in reverse as the rear pump is not operating in the proper direction), the delivery of fluid at full pressure to the reverse servo supply conduit 165a imposes such pressure upon piston 258 that it moves over against the end of the anticreep valve 159a and holds the latter in the right-hand position. So long as the selector valve remains in the reverse position and the engine is running, the pressure is thereby maintained in the piston head chamber 264, regardless of the position of the accelerator pedal and regardless of whether or not the car is in motion, since the front pump continues to supply this pressure. The piston 258 thus constitutes a holding device when the selector valve is shifted to reverse, so that the anticreep system does not again come into play after the first depression of the accelerator pedal, unless the engine is stopped or the selector valve is returned to neutral. This is regarded as advantageous because in maneuvering the car in parking where repeated short backing and stopping with intermittent application of the vehicle brakes is frequently practiced, it has been found more convenient to allow the slow reverse creep to occur than to positively hold the car against reverse creep each time the accelerator pedal is released. It will be noted, however, that the antibump feature of the mechanism is still maintained in shifting from neutral to reverse.

The selector valve of the embodiment of FIG. 3 is indicated as provided with an additional position, designated P, which is intended to denote a parking position. It is assumed that the transmission or a related part incorporates a positive holding member such as a toothed element adapted to engage a gear or clutch portion carried by or connected to the transmission output shaft. This forms a convenient means for holding the car against rolling, and it also imparts to the selector valve an increased path of travel which makes possible the porting arrangement employed in this embodiment.

While the braking means shown herein for holding the car against creep comprises the transmission brakes 40, 64, etc., it will be understood that the principles of the invention could if desired be applied to other braking means, such as the vehicle brakes. That is to say, although I prefer to use the transmission braking means in the manner above described, because of certain advantages such as freedom from the effects of heat developed by brake friction, it will be recognized that the same control features, responsive to the throttle and to the movement of the vehicle could be employed in conjunction with the vehicle wheel brakes or a propeller shaft brake, for example, and many of the benefits of the preferred embodiment described above in detail would thereby be attainable. Also other transmission elements than the reverse brake and forward brake may be employed with the control features, for example, the reverse brake and the second speed clutch (the multiple disk clutch of the transmission illustrated) may be used to hold the car against creep, and other transmissions may afford still different combinations of elements that would serve the same purpose. The words "brake" and "braking means" as employed herein are therefore intended to include any and all suitable devices for arresting or resisting rotation of the vehicle or of an element driven by the transmission.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In an automotive vehicle construction incorporating a prime mover, transmission mechanism including hydrodynamic torque conveying means, braking means engageable to oppose movement of the vehicle, means responsive to operation of the prime mover for automatically applying said braking means, said braking means being fluid-actuatable and said brake applying means responsive to operation of the prime mover including fluid pressure generating means operable by the prime mover and connected to the braking means, pressure limiting means also connected to said braking means to limit the braking effort developed thereby, a speed controller for said prime mover, said speed controller being movable to a minimum speed position and to higher speed positions and means responsive to movement of said controller away from the minimum speed position for rendering said pressure limiting means ineffective.

2. In an automotive vehicle construction incorporating a prime mover, transmission mechanism including hydrodynamic torque conveying means, braking means engageable to oppose movement of the vehicle, means responsive to operation of the prime mover for automatically applying said braking means, said braking means being fluid-actuatable and said brake applying means responsive to operation of the prime mover including fluid pressure generating means operable by the prime mover and connected to the braking means, pressure limiting means also connected to said braking means to limit the braking effort developed thereby, means responsive to movement of the vehicle for rendering said pressure limiting means ineffective, a speed controller for said prime mover, said speed controller being movable to a minimum speed position and to higher speed positions, and means responsive to movement of said controller away from the minimum speed position for rendering said pressure limiting means ineffective.

3. In an automatic transmission system having an input shaft and an output shaft and incorporating a hydrodynamic torque conveyor and adapted to be installed in a wheeled motor vehicle having a motor speed controller movable to and from a reduced speed position, said system being installable in the line of drive between the motor and wheels, braking means engageable to oppose rotation of the output shaft, means responsive to rotation of the input shaft for engaging said braking means, means responsive to movement of said controller away from the reduced speed position for releasing said braking means, and means responsive to rotation of the output shaft for releasing said braking means.

4. In an automotive vehicle construction incorporating a prime mover, transmission mechanism including hydrodynamic torque conveying means, fluid actuatable braking means engageable to oppose movement of the vehicle, a fluid pump operable by the prime mover and connected to the braking means to actuate said braking means to engaged position in response to operation of the prime mover, pressure limiting means connected to said braking means to limit the engaging pressure of said braking means, and means responsive to movement of the vehicle for disabling said pressure limiting means.

5. A construction as defined in claim 4 wherein said means for disabling the pressure limiting means comprises a fluid pump drivable by and in response to movement of the vehicle.

6. A construction as defined in claim 4 wherein said means responsive to movement of the vehicle includes a second fluid pump drivable in response to movement of the vehicle, an anticreep valve interconnecting at least one of said pumps with said braking means and with said pressure limiting means, said anticreep valve being shiftable to disable the pressure limiting means, a speed regulator for said prime mover movable to and from a minimum speed position, a transfer valve having one inlet which is connected to the output of the second pump only and having another inlet which is connected to the output of the first-mentioned pump, said transfer valve having an outlet connected to the anticreep valve to shift the latter to a position to disable the pressure limiting means when fluid is delivered to the anticreep valve through the transfer valve from either pump, said transfer valve being operable by the speed regulator to close the first-mentioned inlet of the transfer valve and open the second-mentioned inlet of the transfer valve in response to movement of the speed regulator away from the minimum speed position.

7. A construction as defined in claim 4 wherein said means responsive to movement of the vehicle includes a second fluid pump drivable in response to movement of the vehicle, an anticreep valve interconnecting at least one of said pumps with said braking means and with said pressure limiting means, said anticreep valve being shiftable to disable the pressure limiting means, a speed regulator for said prime mover movable to and from a minimum speed position, a transfer valve having one inlet which is connected to the output of the second pump only and having another inlet which is connected to the outputs of both pumps, said transfer valve having an outlet connected to the anticreep valve to shift the latter to a position to disable the pressure limiting means when fluid is delivered to the anticreep valve through the transfer valve from either pump, said transfer valve being operable by the speed regulator to close the first-mentioned inlet of the transfer valve and open the second-mentioned inlet of the transfer valve in response to movement of the speed regulator away from the minimum speed position.

8. A construction as defined in claim 4 wherein said means responsive to movement of the vehicle includes a second fluid pump drivable in response to movement of the vehicle, an anticreep valve interconnecting at least one of said pumps with said braking means and with said pressure limiting means, said anticreep valve being shiftable to disable the pressure limiting means and to interrupt communication between said braking means and pumps, a speed regulator for said prime mover movable to and from a minimum speed position, a transfer valve having one inlet which is connected to the output of the second pump only and having another inlet which is connected to the outputs of both pumps, said transfer valve having an outlet connected to the anticreep valve to shift the latter to a position to disable the pressure limiting means and to interrupt communication between said braking means and pumps when fluid is delivered to the anticreep valve through the transfer valve from either pump, said transfer valve being operable by the speed regulator to close the first-mentioned inlet of the transfer valve and open the second-mentioned inlet of the transfer valve in response to movement of the speed regulator away from the minimum speed position.

9. In an automotive vehicle construction incorporating a prime mover, transmission mechanism including hydrodynamic torque conveying means, said transmission mechanism also including at least two fluid-actuatable braking means individually engageable to control the driving effect of the transmission and simultaneously engageable to oppose movement of the vehicle, a source of fluid under pressure controllable by the prime mover and connected to the braking means to actuate both of said braking means to engaged position in response to operation of the prime mover, and means responsive to movement of the vehicle for disconnecting one of said braking means from said source.

10. Transmission mechanism as defined in claim 9 wherein one of said braking means controls a forward drive and the other a reverse drive, a drive selector movable to forward and reverse positions to provide alternative connections between said source and said braking means to condition forward and reverse drives, respectively, and a valve operable by said selector for changing the connections between said braking means and source, said valve being interposed between said source and said disconnecting means.

11. In an automotive vehicle construction incorporating a prime mover, transmission mechanism including hydrodynamic torque conveying means, said transmission mechanism also including at least two fluid-actuatable braking means individually engageable to control the driving effect of the transmission and simultaneously engageable to oppose movement of the vehicle, a source of fluid under pressure controllable by the prime mover and connected to the braking means to actuate both of said braking means to engaged position in response to operation of the prime mover, and means responsive to movement of the vehicle for disconnecting one of said braking means from said source, said disconnecting means comprising a fluid-actuatable valve.

12. In an automotive vehicle construction incorporating a prime mover, transmission mechanism including hydrodynamic torque conveying means, said transmission mechanism also including at least two fluid-actuatable braking means individually engageable to control the driving effect of the transmission and simultaneously engageable to oppose movement of the vehicle, a source of fluid under pressure controllable by the prime mover and connected to the braking means to actuate both of said braking means to engaged position in response to operation of the prime mover, and means responsive to movement of the vehicle for disconnecting one of said braking means from said source, said disconnecting means comprising a fluid-actuatable valve, means for directing actuating fluid to said valve in response to movement of the vehicle, a speed regulator for said prime mover, and means for directing actuating fluid to said valve in response to movement of the regulator away from a low speed position.

13. In an automotive vehicle construction incorporating a prime mover, transmission mechanism including hydrodynamic torque conveying means, said transmission mechanism also including at least two fluid-actuatable braking means individually engageable to control the driving effect of the transmission and simultaneously engageable to oppose movement of the vehicle, a source of fluid under pressure controllable by the prime mover and connected to the braking means to actuate both of said braking means to engaged position in response to operation of the prime mover, means responsive to movement of the vehicle for disconnecting one of said braking means from said source, said disconnecting means comprising a fluid-actuatable valve having an actuating servomotor chamber, a second source of fluid under pressure controllable by and in response to movement of the vehicle, a speed regulator for said prime mover, means responsive to movement of said regulator to a low speed position for connecting said servomotor chamber to said second source, and means responsive to movement of said regulator to a higher speed position for connecting said servomotor chamber to both of said sources.

14. In an automotive vehicle construction incorporating an engine, transmission mechanism including hydrodynamic torque conveying means, said transmission mechanism also including at least two fluid actuatable braking means individually engageable to control the driving effect of the transmission and simultaneously engageable to oppose movement of the vehicle, a first pump drivable by the engine, a second pump drivable by the vehicle independently of the engine, an anticreep control valve controlling communication between said pumps and said braking means and shiftable to connect the outputs of said pumps to either one of said braking means or to both of said braking means simultaneously, means biasing said control valve to the position in which it connects the outputs of said pumps to both of said braking means, actuating servomotor means for said valve whereby the valve may be moved against the effect of said biasing means, a speed regulator for said engine, and a transfer valve arranged in series with said servomotor means and actuatable by said regulator to connect said servomotor means only to the second of said pumps when said regulator is moved to a low speed position and to connect said servomotor means to both of said pumps when said regulator is moved to a higher speed position.

15. A construction as defined in claim 14 including a main fluid supply manifold passage to which the output of each of said pumps is connected, a pair of check valves, one interposed between each of said pump outputs and said manifold passage to prevent backflow to each pump, said transfer valve having one inlet connected to said second pump between the output of said second pump and the check valve, said transfer valve having another inlet connetcted to said manifold passage, an outlet of said manifold passage being connected to said servomotor means.

16. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve.

17. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve, a pressure limiting device connected to an outlet of said control valve and connected to both of said previously-mentioned outlets of the control valve when the control valve is in the position to which it is urged by said biasing means, said outlet to the pressure limiting device being disconnected when said control valve is moved to the other position.

18. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve, a pressure limiting device connected to an outlet of said control valve and connected to both of said previously-mentioned outlets of the control valve when the control valve is in the position to which it is urged by said biasing means, said outlet to the pressure limiting device being disconnected when said control valve is moved to the other position, at least one of said two first-mentioned outlets of said control valve being operatively connected to said servomotor means, whereby such outlet pressure may tend to move said control valve against the effort of said biasing means, the biasing means being strong enough to overcome such outlet pressure in the servomotor means when said pressure limiting means is not disconnected, but the full pump pressure being sufficient to overcome the biasing means.

19. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve, a pressure limiting device connected to an outlet of said control valve and connected to both of said previously-mentioned outlets of the control valve when the control valve is in the position to which it is urged by said biasing means, said outlet to the pressure limiting device being disconnected when said control valve is moved to the other position, at least one of said two first-mentioned outlets of said control valve being operatively connected to said servomotor means, whereby such outlet pressure may tend to move said control valve against the effort of said biasing means, the biasing means being strong enough to overcome such outlet pressure in the servomotor means when said pressure limiting means is not disconnected, but the full pump pressure being sufficient to overcome the biasing means, said servomotor means having a plurality of isolated actuating chambers, said transfer valve being connected to one of said chambers, and the connection between one of the outlets of the control valve and the servomotor means being to the other of said chambers.

20. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve, a pressure limiting device connected to an outlet of said control valve and connected to both of said previously-mentioned outlets of the control valve when the control valve is in the position to which it is urged by said biasing means, said outlet to the pressure limiting device being disconnected when said control valve is moved to the other position, at least one of said two first-mentioned outlets of said control valve being operatively connected to said servomotor means, whereby such outlet pressure may tend to move said control valve against the effort of said biasing means, the biasing means being strong enough to overcome such outlet pressure in the servomotor means when said pressure limiting means is not disconnected, but the full pump pressure being sufficient to overcome the biasing means, said servomotor means having a plurality of isolated actuating chambers, said transfer valve being connected to one of said chambers, the connection between one of the outlets of the control valve and the servomotor means being to the other of said chambers, and a valving portion forming a part of said servomotor means and movable to interrupt communication between said transfer valve and servomotor means when the servomotor means is actuated by the outlet pressure.

21. In a construction as defined in claim 14, a selector valve interposed between said control valve and said pumps, said selector valve having an inlet connectable to both pumps and having a plurality of outlets leading to a corresponding plurality of inlets of the control valve, the control valve having an outlet connected to each of said braking means, said control valve when in the position to which it is urged by said biasing means connecting both of said braking means to one of the inlets of the control valve, said control valve when moved to another position connecting said braking means to different inlets of the control valve, a pressure limiting device connected to an outlet of said control valve and connected to both of said previously-mentioned outlets of the control valve when the control valve is in the position to which it is urged by said biasing means, said outlet to the pressure limiting device being disconnected when said control valve is moved to the other position, at least one of said two first-mentioned outlets of said control valve being operatively connected to said servomotor means, whereby such outlet pressure may tend to move said control valve against the effort of said biasing means, the biasing means being strong enough to overcome such outlet pressure in the servomotor means when said pressure limiting means is not disconnected, but the full pump pressure being sufficient to overcome the biasing means, said servomotor means having a plurality of isolated actuating chambers, said transfer valve being connected to one of said chambers, and the connection between one of the outlets of the control valve and the servomotor means being to the other of said chambers and to the outlet of said control valve which leads to a braking means incorporated in the reverse drive mechanism of the transmission.

22. In combination with a transmission mechanism incorporating a hydrodynamic torque conveying device and forward and reverse drive controlling means including forward drive reaction braking mechanism and reverse drive reaction braking mechanism and having input and output shafts connected to said transmission construction and operatively connected to said hydrodynamic torque conveying device during operation of the transmission, means for preventing unwanted transmission of friction drag torque from the input shaft to the output shaft comprising an antidrag controller operatively connected to both of said braking mechanisms and actuatable to simultaneously engage both of said mechanisms.

23. A transmission construction as defined in claim 22 adapted for installation in a motor vehicle having a manual engine control or the like movable in one direction to increase the speed of the engine and movable in another direction to decrease the speed of the engine to a predetermined minimum established by a minimum position of said control, and overcontrolling means interconnecting said speed control with said first-mentioned antidrag controller to disable the latter and release at least one of said braking means in response to movement of said manual control away from said minimum position.

24. A transmission construction as defined in claim 22 adapted for installation in a motor vehicle having a manual engine control or the like movable in one direction to increase the speed of the engine and movable in another direction to decrease the speed of the engine to a predetermined minimum established by a minimum position of said control, overcontrolling means interconnecting said speed control with said first-mentioned drag control to disable the latter and release at least one of said braking means in response to movement of said manual control away from said minimum position, power supplying means responsive to movement of the vehicle and which is substantially disabled by and in response to stopping of the vehicle, and means interconnecting said power supplying means and said first-mentioned control to disable the latter and release at least one of said braking mechanisms in response to activation of said power supplying means due to movement of the vehicle.

25. In combination with a transmission mechanism incorporating a hydrodynamic torque conveying device and forward and reverse drive controlling means including forward drive reaction braking mechanism and reverse drive reaction braking mechanism and having input and output shafts connected to said transmission construction and operatively connected to said hydrodynamic torque conveying device during operation of the transmission, means for preventing unwanted transmission of friction drag torque from the input shaft to the output shaft comprising an antidrag controller operatively connected to both of said braking mechanisms and actuatable to simultaneously engage both of said mechanisms, power supplying means responsive to movement of the vehicle and which is substantially disabled by and in response to stopping of the vehicle, and means interconnecting said power supplying means and said first-mentioned control to disable the latter and release at least one of said braking mechanisms in response to activation of said power supplying means due to movement of the vehicle.

26. In a transmission control mechanism, in combination with hydrodynamic torque conveying means and a transmission having an output shaft, braking means effective to hold the output shaft against rotation, primary brake applying means, supplemental brake holding means for preventing unwanted complete release of said braking means, and means including a pump operable by said output shaft responsive to movement of the vehicle for automatically rendering said brake holding means ineffective.

27. In a transmission control mechanism, in combination with hydrodynamic torque conveying means and a transmission having an output shaft, braking means effective to hold the output shaft against rotation, primary brake applying means, supplemental brake holding means for preventing unwanted complete release of said braking means, means responsive to movement of the vehicle for automatically rendering said brake holding means ineffective, said mechanism being adapted for installation in a motor driven vehicle having a motor speed controller, and means responsive to movement of the controller away from a minimum speed position for rendering said brake holding means ineffective.

28. In a transmission control mechanism adapted for installation in a motor vehicle having a motor speed controller, in combination with hydrodynamic torque conveying means and a transmission having an output shaft, braking means effective to hold the output shaft against rotation, primary brake applying means, supplemental brake holding means for preventing unwanted complete release of said braking means, and means responsive to movement of the controller away from a minimum speed position for rendering said brake holding means ineffective.

29. A mechanism having a driving member and a driven member and including two braking devices which when both are engaged will resist rotation of the driven member of the mechanism, while release of either or both braking devices permits rotation of the driven member, individual brake applying means for concurrently engaging both of said braking devices, and means responsive to rotation of the driven member for releasing one of said braking devices, reversing means appurtenant to said mechanism settable in different conditions to change the direction of rotation of the driven member, said means for releasing the braking devices including means for releasing one of said braking devices when said reversing means is set to drive said driven member in one direction, and for releasing the other of said braking devices when said reversing means is set to drive said driven member in the opposite direction.

30. In combination with a transmission mechanism incorporating forward and reverse drive controlling means and a driven member and adapted to be driven by an engine having a speed regulator control, means effective to resist rotation of the driven member, controlling means for controlling the effective resistance to rotation of the driven member or eliminating such resistance in response to movement of the engine speed regulator control when the forward and reverse drive controlling means is set for forward drive, and for controlling only the elimination of such resistance in response to movement of the engine speed regulator control when the forward and reverse drive controlling means is set for reverse drive.

31. A mechanism having a driving member and a driven member and including two sets of engageable elements which when both sets are engaged will resist rotation of the driven member of the mechanism while release of one set will tend to cause the driven member to rotate in the same direction as the driving member and the release of the other set will tend to cause the driven member to rotate in a direction opposite to that of the driving member, means for causing the engagement and release of the said engageable elements, a first control means for controlling the last named means to cause engagement or release of one of the said sets of engageable elements, and a second control means for selecting which of the said sets will be controlled for engagement and release.

32. A mechanism having a driving member and a driven member and including two sets of engageable elements which when both sets are engaged will resist rotation of the driven member of the mechanism while release of one set will tend to cause the driven member to rotate in the same direction as the driving member and the release of the other set will tend to cause the driven member to rotate in a direction opposite to that of the driving member, means for causing the engagement and release of the said engageable elements, a first control means for controlling the last named means to cause engagement or release of one of the said sets of engageable elements, a second control means for selecting which of the said sets will be controlled for engagement and release, and a third control means for preventing engagement of the engageable elements after once disengaged when the said second control means is set for control of the set of engageable elements that tends to cause the driven member to rotate in a direction opposite to that of the driving member.

33. In transmission mechanism for an automotive vehicle having a driving engine with a throttle, the combination of a drive shaft adapted to be driven by the vehicle engine, a driven shaft, means including a hydrodynamic coupling device for providing a power train between said shafts, means for temporarily holding said driven shaft from rotation due to torque transmitted through said hydrodynamic device and power train at vehicle engine idling speeds and including means for simultaneously completing a second different power train between said shafts, said second power train completing means including actuating means dependent upon actuation of said first power train providing means, a control for the vehicle engine throttle, and means under the control of said throttle control for automatically breaking said second power train when the throttle control is moved toward an open throttle position to permit driving of said driven shaft through said first mentioned power train.

34. In transmission mechanism for an automotive vehicle having a driving engine with a throttle, the combination of a drive shaft adapted to be driven by the vehicle engine, a driven shaft, a hydrodynamic coupling device driven by said drive shaft, means for completing a power train between said hydrodynamic device and said driven shaft, means for temporarily holding said driven shaft from rotation due to torque transmitted through said hydrodynamic device and power train at vehicle engine idling speeds and including means for simultaneously completing a second different power train between said hydrodynamic device and said driven shaft, said second power train completing means including actuating means dependent upon actuation of said first power train completing means, a control for the vehicle engine throttle, and means under the control of said throttle control for automatically breaking said second power train when the throttle control is moved toward an open throttle position to permit driving of said driven shaft through said first mentioned power train.

35. In transmission mechanism for an automotive vehicle having a driving engine with a throttle, the combination of a drive shaft adapted to be driven by the vehicle engine, a driven shaft, a hydrodynamic coupling device driven by said drive shaft, means for completing a power train between said hydrodynamic device and said driven shaft, said means including an engaging device and a fluid pressure motor effective on the engaging device, means for temporarily holding said driven shaft from rotation due to torque transmitted through said hydrodynamic device and power train at vehicle engine idling speeds and including means for simultaneously completing a second different power train between said hydrodynamic device and said driven shaft, said last named means comprising a second engaging device completing the second power train when engaged, a second fluid pressure motor effective on said second engaging device, a source of fluid pressure, means including a conduit connected to said first named motor for connecting the motor and said pressure source, a valve for connecting and disconnecting said conduit and said second motor, a control for the vehicle engine throttle, and means operatively connecting said valve and said control for actuating the valve to disengage said second engaging device to break said second power train when the throttle control is moved toward an open throttle position to permit driving of said driven shaft through said first mentioned power train.

36. In transmission mechanism for an automotive vehicle having a driving engine with a throttle, the combination of a drive shaft adapted to be driven by the vehicle engine, a driven shaft, a hydrodynamic coupling device driven by said drive shaft, means for completing a power train between said hydrodynamic device and said driven shaft, means for temporarily holding said driven shaft from rotation due to torque transmitted through said hydrodynamic device and power train at vehicle engine idling speeds and including means for simultaneously completing a second different power train between said hydrodynamic device and said driven shaft, a control for the vehicle engine throttle, means under the control of said throttle control for automatically breaking said second power train when the throttle control is moved toward an open throttle position to permit driving of said driven shaft through said first mentioned power train, and means responsive to the speed of said driven shaft and effective on said throttle controlled means for preventing a completion of said second power train when the driven shaft is rotating above a certain predetermined speed to prevent said driven shaft holding means from being operative above a certain vehicle speed.

37. In transmission mechanism for an automotive vehicle having a driving engine with a throttle, the combination of a drive shaft adapted to be driven by the vehicle engine, a driven shaft, a hydrodynamic coupling device driven by said drive shaft, means for completing a power train between said hydrodynamic device and said driven shaft, means for temporarily holding said driven shaft from rotation due to torque transmitted through said hydrodynamic device and power train at vehicle engine idling speeds and including means for simultaneously completing a second different power train between said hydrodynamic device and said driven shaft, said last named means including an engaging device for completing said second power train when engaged, a fluid pressure motor for actuating said engaging device, a source of fluid pressure, and a valve for effectively connecting and disconnecting said motor and said fluid pressure source, a control for the vehicle engine throttle, means connecting said throttle control and said valve for automatically causing disengagement of said engaging device to break said second power train when the throttle control is moved toward an open throttle position to permit driving of said driven shaft through said first mentioned power train, and means responsive to the speed of said driven shaft and effective on said valve for holding said valve in its engaging device disengaging position above predetermined speeds of said driven shaft.

38. In transmission mechanism for an automotive vehicle having a driving engine with a throttle, the combination of a drive shaft adapted to be driven by the vehicle engine, a driven shaft, a hydrodynamic coupling device driven by said drive shaft, means for completing a power train between said hydrodynamic device and said driven shaft, means for temporarily holding said driven shaft from rotation due to torque transmitted through said hydrodynamic device and power train at vehicle engine idling speeds and including means for simultaneously completing a second different power train between said hydrodynamic device and said driven shaft, said last named means including an engaging device for completing said second power train when engaged, a fluid pressure motor for actuating said engaging device, a source of fluid pressure, and a valve for effectively connecting and disconnecting said motor and said fluid pressure source, a control for the vehicle engine throttle, means connecting said throttle control and said valve for automatically causing disengagement of said engaging device to break said second power train when the throttle control is moved toward an open throttle position to permit driving of said driven shaft through said first mentioned power train, and means responsive to the speed of said driven shaft and effective on said valve for holding said valve in its engaging device disengaging position above predetermined speeds of said driven shaft, said speed responsive means including a fluid pump driven by said driven shaft and supplying fluid to said valve under pressures which increase with the speed of the driven shaft for holding the valve in its engaging device releasing position above a predetermined fluid pressure supplied from said pump.

39. In an automotive vehicle construction incorporating a prime mover, transmission mechanism including hydrodynamic torque conveying means, braking means engageable to oppose movement of the vehicle, means responsive to a certain operating condition of the prime mover for automatically applying said braking means, said braking means being fluid actuatable and said brake applying means responsive to operation of the prime mover including fluid pressure generating means operable by the prime mover and connected to the braking means, pressure limiting means also connected to said braking means to limit the braking effort developed thereby, and means responsive to movement of the vehicle for rendering said pressure limiting means ineffective.

40. In an automotive vehicle construction incorporating a prime mover, transmission mechanism including hydrodynamic torque conveying means, braking means engageable to oppose movement of the vehicle, means responsive to operation of the prime mover for automatically applying said brake means only in response to a substantially throttled condition of the prime mover, said braking means being fluid actuatable and said brake applying means responsive to operation of the prime mover including fluid pressure generating means operable by the prime mover and connected to the braking means, pressure limiting means also connected to said braking means to limit the braking effort developed thereby, and means responsive to movement of the vehicle for rendering said pressure limiting means ineffective.

References Cited in the file of this patent

UNITED STATES PATENTS

| | | |
|---|---|---|
| 1,673,863 | Brown | June 19, 1928 |
| 2,144,795 | Cotterman | Jan. 24, 1939 |
| 2,266,213 | Kattwinkel | Dec. 16, 1941 |
| 2,276,862 | Peterson | Mar. 17, 1942 |
| 2,324,693 | Griswold | July 20, 1943 |
| 2,394,331 | Roche | Feb. 5, 1946 |
| 2,399,567 | Peterson | Apr. 30, 1946 |
| 2,449,020 | Spraragen | Sept. 7, 1948 |
| 2,457,729 | Roberts et al. | Dec. 28, 1948 |
| 2,479,183 | Peterson | Aug. 16, 1949 |
| 2,528,584 | Farkas | Nov. 7, 1950 |
| 2,541,391 | Weiss | Feb. 13, 1951 |
| 2,549,125 | Paton | Apr. 17, 1951 |
| 2,559,922 | Alspaugh | July 10, 1951 |
| 2,566,518 | Farkas | Sept. 4, 1951 |
| 2,631,700 | Long et al. | Mar. 17, 1953 |
| 2,679,768 | Baule | June 1, 1954 |